United States Patent
Li et al.

(10) Patent No.: US 8,380,070 B2
(45) Date of Patent: Feb. 19, 2013

(54) UPGRADING METHOD, SYSTEM AND APPARATUS OF LOW-DENSITY WAVELENGTH DIVISION MULTIPLEXING SYSTEM

(75) Inventors: Congqi Li, Shenzhen (CN); Zhiyong Huang, Shenzhen (CN); Zhiwen Chang, Shenzhen (CN); Yuzhi Jin, Shenzhen (CN); Da He, Shenzhen (CN); Jianmei Zhang, Shenzhen (CN); Shouchang Niu, Shenzhen (CN); Shixing Li, Shenzhen (CN); Tianhai Chang, Shenzhen (CN); Jinghua Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 482 days.

(21) Appl. No.: 12/703,278

(22) Filed: Feb. 10, 2010

(65) Prior Publication Data

US 2010/0142960 A1    Jun. 10, 2010

Related U.S. Application Data

(63) Continuation of application No. PCT/CN2008/071085, filed on May 26, 2008.

(30) Foreign Application Priority Data

Aug. 17, 2007    (CN) .......................... 2007 1 0129690

(51) Int. Cl.
*H04J 14/02* (2006.01)
(52) U.S. Cl. ....................................................... 398/82
(58) Field of Classification Search ..................... 398/82
See application file for complete search history.

(56) References Cited

U.S. PATENT DOCUMENTS

| 6,678,476 | B1 | 1/2004 | Hou | |
|---|---|---|---|---|
| 7,003,227 | B2 | 2/2006 | Kim et al. | |
| 2002/0021464 | A1* | 2/2002 | Way | 359/124 |
| 2003/0108353 | A1* | 6/2003 | Nasu et al. | 398/91 |
| 2004/0202473 | A1* | 10/2004 | Nakamura et al. | 398/85 |
| 2007/0116468 | A1* | 5/2007 | Ji et al. | 398/79 |

FOREIGN PATENT DOCUMENTS

| CN | 1302129 A | 7/2001 |
|---|---|---|
| EP | 1 463 224 A2 | 9/2004 |

OTHER PUBLICATIONS

First Office Action in Chinese Application No. 200710129690.0, mailed Jun. 28, 2010.
Written Opinion in PCT Application No. PCT/CN2008/071085, mailed Sep. 11, 2008.
Communication in European Application No. 08748677.5-2415, mailed Aug. 10, 2010.
$2^{nd}$ Office Action in corresponding European Application No. 08748677.5 (Jun. 16, 2011).

* cited by examiner

*Primary Examiner* — Shi K Li
(74) *Attorney, Agent, or Firm* — Leydig, Voit & Mayer, Ltd.

(57) ABSTRACT

An upgrading method, a system, and an apparatus of a low-density wavelength division multiplexing (WDM) system are provided. The method includes: detecting an output wavelength shift of a wavelength conversion unit, and adjusting an output wavelength of the wavelength conversion unit having the output wavelength shift higher than a threshold, so that the output wavelength shift of the wavelength conversion unit is lower than the threshold; adjusting an adjustable interleaved demultiplexer, until requirements for a demultiplexing parameter of a high-density WDM system are met. Thus, the problem that services are interrupted when a low-density MDM system is upgraded to a high-density MDM system is solved. A WDM system, and a wavelength multiplexing/demultiplexing apparatus and method are also provided.

5 Claims, 14 Drawing Sheets

UPGRADING METHOD, SYSTEM AND APPARATUS OF LOW-DENSITY WAVELENGTH DIVISION MULTIPLEXING SYSTEM

CROSS-REFERENCE TO RELATED APPLICATIONS

This application is a continuation of International Patent Application No. PCT/CN2008/071085, filed May 26, 2008, which claims priority to Chinese Patent Application No. 200710129690.0, filed Aug. 17, 2007, both of which are hereby incorporated by reference in their entireties.

FIELD OF THE TECHNOLOGY

The present invention relates to the field of communication, and more particularly to an upgrading method, system, and apparatus of a low-density wavelength division multiplexing system.

BACKGROUND OF THE INVENTION

With the rapid development of communication technology, during the process of data communication, the requirement for the capacity of communication is increased. The advancement of optical devices promotes the development of the optical communication technology significantly, and thus high-capacity transmission technology is applied maturely. Wavelength division multiplexing (MDM) technology, as a multiplexing mode for increasing communication capacity in fiber communication, is used more and more widely.

The essence of the WDM technology is as follows: at the transmitter side, each service signal is borne by a different wavelength, and the different wavelength is multiplexed to an optical signal (light wave) by an optical multiplexer, and is transferred to the receiver side through a physical link; at the receiver side, the optical signal of the different wavelength is demultiplexed by an optical demultiplexer, and a different wavelength conversion unit extracts the service signal.

The maximum transmission capacity supported by a WDM system is mainly limited by the following three factors: the service rate that a single wave can bear, the range of wave band, and the wavelength multiplexing density.

As for the first factor, the service rate that the single wave can bear has been increased from 2.5 G to 10 G, and then from 10 G to the present 40 G. However, the frequency of an electronic device itself limits the increase of the rate. Further, the increase of the service rate causes more problems in the transmission process of optical signals, for example, limits such as the Optical Signal to Noise Ratio (OSNR), Polarization Mode Dispersion (PMD), Polarization Dependent Loss (PDL), and dispersion restrict the wavelength transmission distance and narrow the application scope. Therefore, it becomes more and more difficult to improve the transmission capacity of the WDM system by increasing the rate.

As for the second factor, the wavelength range is expanded from the initial C band to the C+L band, and then to the present C+L+S band, and more wavelengths can be accommodated due to the expanded wave band range. However, on the one hand, the transmission property of different wave bands is different; for example, S wave band has high loss and has no matching low-cost amplifier, so it is very difficult to apply the WDM system of the S wave band in practice. On the other hand, strong Raman effect occurs when multiple wave bands are transferred in one fiber, which will cause higher loss of the shortwave band, and impact the overall transmission capacity of the system. Furthermore, demultiplexing and multiplexing of different wave bands often brings additional loss, which will further limit the transmission capacity of the system. Additionally, different wave bands require different amplifiers, so the cost of the system is increased.

As for the third factor, spectrum utilization efficiency of most current WDM systems is lower than 0.1 bit/Hz, and increase of the wavelength division density can improve the spectrum utilization efficiency of a system, thus achieving the purpose of increasing the transmission capacity. However, considering the processing capability of the optical multiplexer and optical demultiplexer, the wavelength interval needs to be determined in the design of the current high-density WDM system and cannot be changed after the design is completed. Although the multiplexer/demultiplexer can be inserted into the optical path by using an optical switch or manually presently to realize the upgrade from a low-density multiplexing system to a high-density multiplexing system, the interruption of services will happen. For the WDM system bearing a large amount of services, the upgrade realized at the cost of interruption of services cannot be accepted by users.

For example, when a system with a wavelength interval of 100 GHz is upgraded to a system with a wavelength interval of 50 GHz, it is necessary to insert a parity interleaved multiplexer/demultiplexer on the line. If the parity interleaved multiplexer is not configured in advance, it is necessary to interrupt the service during the upgrade. Further, when inserting a parity interleaved multiplexer/demultiplexer in the main optical path, as the parity interleaved multiplexer/demultiplexer has a certain loss, the power budget of the entire link needs to be readjusted, which costs too much time, and the 100 G interval wavelength conversion unit also needs to be changed into a 50 G interval wavelength conversion unit, and thus the entire system is all changed actually. As a result, the upgrade from the low-density WDM system to the high-density WDM system is often impracticable.

SUMMARY OF THE INVENTION

Accordingly, the present invention is directed to an upgrading method, system, and apparatus of a low-density wavelength division multiplexing system, which solve the problem that services are interrupted when the low-density WDM system is upgraded.

In an embodiment, the present invention provides an upgrading method of a low-density wavelength division multiplexing system, which includes the following steps.

An output wavelength shift of a wavelength conversion unit is detected, and an output wavelength having the output wavelength shift greater than a threshold of the wavelength conversion unit is adjusted, so that the output wavelength shift of the wavelength conversion unit is lower than the threshold.

An adjustable interleaved demultiplexer is adjusted until requirements for a multiplexing parameter of a high-density wavelength division multiplexing system are met.

In an embodiment, the present invention provides an upgradeable low-density wavelength division multiplexing system, which includes a transmitter side, a receiver side, and a control unit.

The transmitter side includes an adjustable interleaved multiplexer or coupler, one or more wavelength conversion units, one or more fixed wavelength multiplexing units, in which an output optical signal of the wavelength conversion unit is multiplexed by the fixed wavelength multiplexing unit, and the output optical signal of the fixed wavelength multiplexing unit is multiplexed by the adjustable interleaved multiplexer or coupler.

The receiver side includes an adjustable interleaved demultiplexer, one or more fixed wavelength demultiplexing units, and one or more wavelength conversion units, in which the adjustable interleaved demultiplexer interleaves and demultiplexes the received optical signal and transmits the interleaved and demultiplexed optical signal to the fixed wavelength demultiplexing unit to demultiplex a wavelength signal, and transmits the demultiplexed wavelength signal to the wavelength conversion unit.

The control unit is configured to send an adjust command to the adjustable interleaved demultiplexer when a wavelength usage of the low-density wavelength division multiplexing system reaches a threshold.

The adjustable interleaved demultiplexer is configured to perform adjustment according to the received adjust command until requirements for a demultiplexing parameter of a high-density wavelength division multiplexing system are met.

In an embodiment, the present invention provides a multiplexing upgrading method of a low-density wavelength division multiplexing system, which includes the following steps.

An output wavelength shift of a wavelength conversion unit is detected.

According to the detection result, an output wavelength having the output wavelength shift greater than a threshold of the wavelength conversion unit is adjusted, so that the output wavelength shift of the wavelength conversion unit is lower than the threshold.

In an embodiment, the present invention provides a demultiplexing upgrading method of a low-density wavelength division multiplexing system, which includes the following steps.

According to a set demultiplexing parameter, an adjustable interleaved demultiplexer is adjusted until requirements for a demultiplexing parameter of a high-density wavelength division multiplexing system are met.

In an embodiment, the present invention provides an upgradeable wavelength multiplexing apparatus, which includes one or more fixed wavelength multiplexing modules and an adjustable interleaved multiplexer.

The one or more fixed wavelength multiplexing modules are configured to multiplex more than one wavelength and/or more than one wavelength group.

The adjustable interleaved multiplexer is connected to the fixed wavelength multiplexing modules, and is configured to multiplex a signal multiplexed by the fixed wavelength multiplexing modules.

The adjustable interleaved multiplexer is adjusted according to a set multiplexing parameter until requirements for a multiplexing parameter of a high-density wavelength division multiplexing system are met.

In an embodiment, the present invention provides an upgradeable wavelength demultiplexing apparatus, which includes an adjustable interleaved demultiplexer and one or more fixed wavelength demultiplexing modules.

The adjustable interleaved demultiplexer is configured to interleave and demultiplex an input signal.

The one or more fixed wavelength demultiplexing modules are connected to adjustable interleaved demultiplexer, and are configured to demultiplex the signal interleaved and demultiplexed by the adjustable interleaved demultiplexer.

The adjustable interleaved demultiplexer is adjusted according to a set demultiplexing parameter until requirements for a demultiplexing parameter of a high-density wavelength division multiplexing system are met.

In an embodiment, the present invention provides an upgradeable wavelength multiplexing method, which is applicable to a system including one or more fixed wavelength multiplexing modules and one or more adjustable interleaved multiplexers, and includes the following steps.

The fixed wavelength multiplexing modules multiplex more than one wavelength and/or more than one wavelength group.

The adjustable interleaved multiplexers multiplex a signal multiplexed by the wavelength multiplexing modules, and are adjusted according to a set multiplexing parameter until requirements for a multiplexing parameter of a high-density wavelength division multiplexing system are met.

In an embodiment, the present invention provides an upgradeable wavelength demultiplexing method, which is applicable to a system including one or more fixed wavelength demultiplexing modules and one or more adjustable interleaved demultiplexers, and includes the following steps.

The adjustable interleaved demultiplexers interleave and demultiplex an input signal, and are adjusted according to a set demultiplexing parameter until requirements for a demultiplexing parameter of a high-density wavelength division multiplexing system are met.

The fixed wavelength demultiplexing modules demultiplex the signal interleaved and demultiplexed by the adjustable interleaved demultiplexers.

In the embodiments of the present invention, by adjusting the wavelength conversion units, the requirements for the output wavelength shift are met. Further, the multiplexing parameter of the adjustable interleaved demultiplexer and the demultiplexing parameter of the adjustable interleaved demultiplexer are adjusted until the wavelength usage of the wavelength division multiplexing system is a first set value. Thus, the problem that the services are interrupted when the low-density WDM system is upgraded to the high-density WDM system is solved.

DETAILED DESCRIPTION OF THE EMBODIMENTS

In an embodiment of the present invention, when the wavelength usage of a wavelength division multiplexing system is higher than a second set value, it indicates that the current WDM system needs to be upgraded, so that an output wavelength shift of the wavelength conversion unit is not greater than a shift threshold, and the wavelength usage of the wavelength division multiplexing system is a first set value.

The shift threshold, the first set value, and the second set value are preset by a user according to the requirements. For example, if the user desires a wavelength interval of 50 G after the upgrade of the system, the shift of the wavelength must be no greater than 5 GHz, and the shift threshold is 5 GHz; if the user desires a wavelength interval of 100 G after the upgrade of the system, the shift of the wavelength must be no smaller than 12.5 GHz, and at this time the shift threshold is 12.5 GHz, that is, the shift threshold is a shift allowed by the upgraded WDM system.

Before being upgraded, the WDM system can be considered as a low-density WDM system, and the upgraded WDM system can be considered as a high-density WDM system. Herein, "high" and "low" are relative concepts. In the subsequent description, the system before being upgraded is referred to as a low-density system, and the upgraded system is referred to as a high-density system, and the system after being upgraded for multiple times is referred to as a higher-density system.

The present invention is described in detail below with reference to the accompanying drawings.

Figure 1:
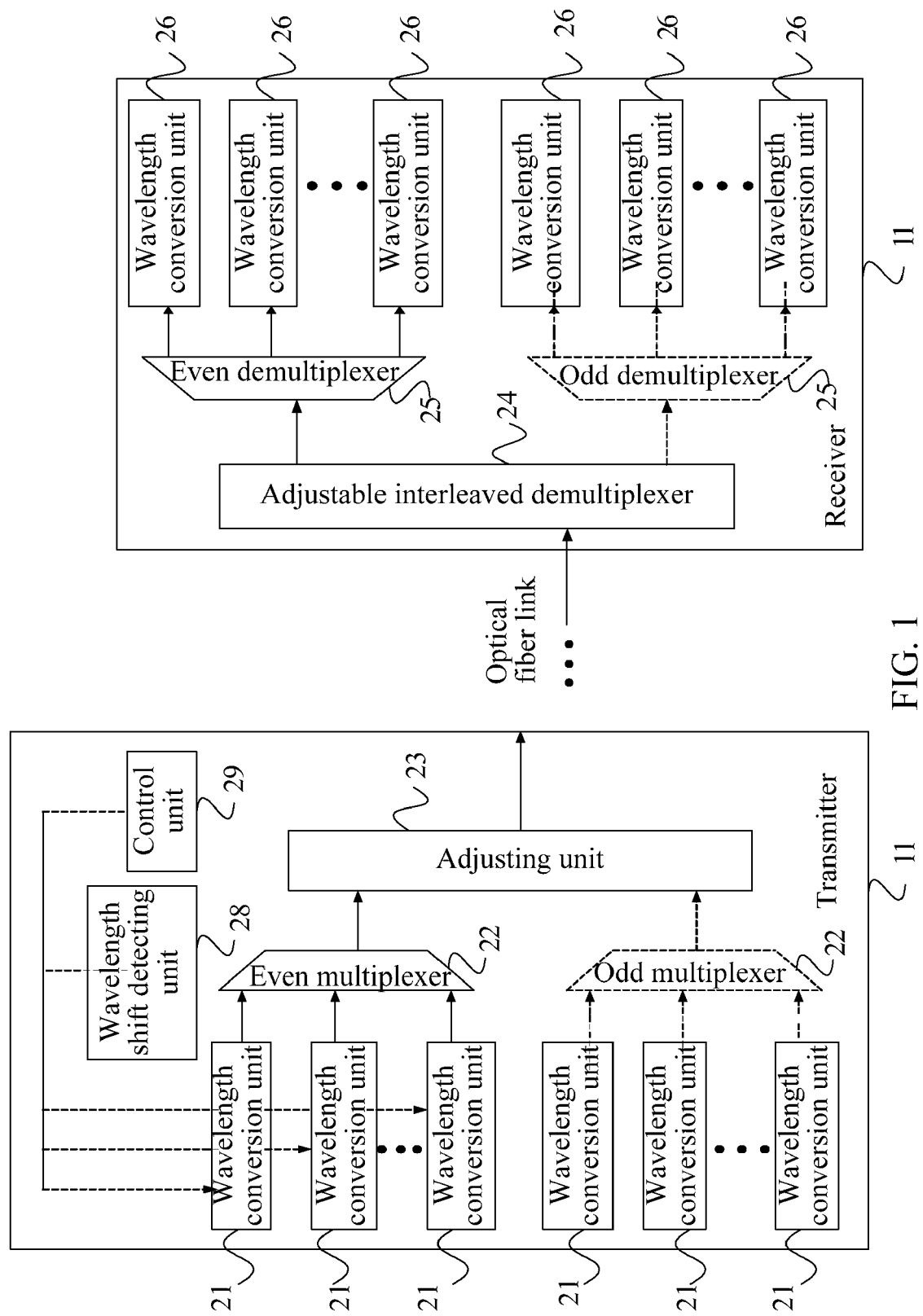
FIG. 1 is a schematic structural view of a wavelength division multiplexing system according to Embodiment 1 of the present invention.

FIG. 1 is a schematic structural view of a WDM system according to Embodiment 1 of the present invention. As shown in FIG. 1, the solid lines indicate the WDM system having a relative low density before being upgraded, and the solid lines and the dashed lines are combined to form the WDM system having a relative high density after the system is upgraded according to this embodiment. It can be seen from FIG. 1 that, the system includes a transmitter 11 and a receiver 12.

The transmitter 11 includes one or more wavelength conversion units 21, one or more fixed wavelength multiplexing units 22, and an adjusting unit 23. The wavelength conversion unit 21 is configured to output a light wave. The fixed wavelength multiplexing unit 22 is configured to perform wavelength division multiplexing on the light wave output by the wavelength conversion unit 21. The adjusting unit 23 is configured to further multiplex the light wave multiplexed and output by the fixed wavelength multiplexing unit 22 and make a wavelength usage of the wavelength division multiplexing system be a first set value.

In this embodiment, the fixed wavelength multiplexing unit 22 can be an even multiplexer and/or an odd multiplexer.

The receiver 12 includes an adjustable interleaved demultiplexer 24, one or more fixed wavelength demultiplexing units 25, and one or more wavelength conversion units 26. The adjustable interleaved demultiplexer 24 is configured to interleave and demultiplex the light wave multiplexed and output by the adjusting unit 23 and make the wavelength usage of the wavelength division multiplexing system be the first set value through adjustment of the adjustable interleaved demultiplexer 24. The fixed wavelength demultiplexing unit 25 is configured to further demultiplex the light wave interleaved and demultiplexed by the adjustable interleaved demultiplexer 24. The wavelength conversion unit 26 is configured to receive the light wave demultiplexed by the fixed wavelength demultiplexing unit 25.

In this embodiment, the fixed wavelength demultiplexing unit 25 can be an even demultiplexer and/or an odd demultiplexer.

When the wavelength usage of the wavelength division multiplexing system is the first set value, it indicates that the current wavelength division multiplexing system has been upgraded, and is a high-density WDM system; when the wavelength usage of the wavelength division multiplexing system is higher than the second set value, it indicates that the wavelength division multiplexing system needs to be upgraded, and is a low-density WDM system.

The adjusting unit 23 transmits the processed light wave to the receiver 12 through an optical fiber link.

The adjusting unit 23 can be an adjustable interleaved multiplexer or a coupler.

When the adjusting unit 23 is an adjustable interleaved multiplexer 27, the adjustable interleaved multiplexer 27 is configured to make the wavelength usage of the wavelength division multiplexing system be the first set value by adjusting multiplexing parameter thereof. The adjustable interleaved demultiplexer 24 is configured to make the wavelength usage of the wavelength division multiplexing system be the first set value by adjusting demultiplexing parameter thereof.

Furthermore, the multiplexing parameter and the demultiplexing parameter include, but are not limited to, a channel interval, channel bandwidth, or channel isolation. The adjustable interleaved multiplexer 27 is configured to make the wavelength usage of the wavelength division multiplexing system be the first set value by adjusting the channel interval, the channel bandwidth, or the channel isolation thereof. The adjustable interleaved demultiplexer 24 is configured to make the wavelength usage of the wavelength division multiplexing system be the first set value by adjusting the channel interval, the channel bandwidth, or the channel isolation thereof.

In an embodiment of the present invention, when the adjusting unit 23 is the adjustable interleaved multiplexer 27, the output wavelength shift of each wavelength conversion unit 21 must be no higher than the shift threshold. The method for achieving this objective includes, but is not limited to, the following two situations.

1. The transmitter 11 further includes a wavelength shift detecting unit 28 and a control unit 29. The wavelength shift detecting unit 28 is configured to detect the wavelength shift output by the wavelength conversion unit 21. The control unit 29 is configured to send an adjust command to the wavelength conversion unit 21 having an output wavelength shift greater than the shift threshold according to the detection result of the wavelength shift detecting unit 28. The wavelength conversion unit 21 is configured to adjust the output wavelength according to the received adjust command, so that the output wavelength is not higher than the shift threshold.

2. The wavelength conversion unit 21 is directly configured to be a wavelength conversion unit having high wavelength stability and is adjusted, so that the output wavelength shift is not higher than the shift threshold. For example, if it is desired that the upgraded wavelength interval is 50 G, the wavelength conversion unit having high wavelength stability is configured to a state required by the system satisfying the condition that the wavelength interval is 50 G in the initial design of the system.

In this embodiment, the adjustable interleaved multiplexer and the adjustable interleaved demultiplexer can be an adjustable parity interleaved multiplexer and an adjustable parity interleaved demultiplexer respectively. Definitely, the adjustable interleaved multiplexer and the adjustable interleaved demultiplexer may also be other multiplexers and demultiplexers.

The WDM system can include one or more adjustable interleaved demultiplexers, and/or one or more adjustable interleaved multiplexers or couplers to realize multiple upgrade.

In the WDM system, when the wavelength usage is higher than the second set value again, another upgrade is required on the basis of the previous upgrade. At this time, the transmitter 11 at least further includes a first adjustable interleaved multiplexer, configured to further multiplex the light wave multiplexed and output by the adjustable interleaved multiplexer 27, and adjust the multiplexing parameter thereof to make the wavelength usage of the wavelength division multiplexing system be the first set value again. The receiver 12 at least further includes a first adjustable interleaved demultiplexer, configured to demultiplex the light wave input by the transmitter 11, adjust the demultiplexing parameter thereof to make the wavelength usage of the wavelength division multiplexing system be the first set value, and output the demultiplexed light wave to the adjustable interleaved demultiplexer 24.

In this embodiment and subsequent embodiments, the adjustable interleaved multiplexer includes, but is not limited to, a symmetric adjustable interleaved multiplexer, an asymmetric adjustable interleaved multiplexer; a bandwidth splitting ratio adjustable parity interleaved multiplexer, or an optical power distribution ratio adjustable parity interleaved multiplexer. The adjustable interleaved demultiplexer includes, but is not limited to, a symmetric adjustable interleaved demultiplexer, an asymmetric adjustable interleaved demultiplexer, a bandwidth splitting ratio adjustable parity interleaved demultiplexer, or an optical power distribution ratio adjustable parity interleaved demultiplexer.

If the adjustable interleaved multiplexer and the adjustable interleaved demultiplexer are a bandwidth splitting ratio adjustable parity interleaved multiplexer and a bandwidth splitting ratio adjustable parity interleaved demultiplexer respectively, the bandwidth splitting ratio is adjusted; if the adjustable interleaved multiplexer and the adjustable interleaved demultiplexer are an optical power distribution ratio adjustable parity interleaved multiplexer and an optical power distribution ratio adjustable parity interleaved demultiplexer respectively, the optical power distribution ratio is adjusted.

Taking the transmitter including an adjustable interleaved multiplexer for example, in this embodiment of the present invention, the working mode of the wavelength division multiplexing system includes: in the transmitter, on one hand, if the wavelength usage of the current WDM system is higher than the second set value, that is, when the channel number is small, the adjustable interleaved multiplexer adjusts the multiplexing parameter thereof, so that the wavelength usage of the WDM system is the first set value; and on the other hand, when it is detected that some output wavelength shifts of the wavelength conversion unit are higher than the shift threshold, the wavelength conversion unit adjusts the output wavelength until the output wavelength shifts are not higher than the shift threshold. In the receiver, the light wave input by the output apparatus is interleaved and demultiplexed; as the wavelength usage of the current WDM system is higher than the second set value, the adjustable interleaved demultiplexer adjusts the demultiplexing parameter thereof, so that the wavelength usage of the WDM system also is the first set value.

The method of the present invention is described below in detail with the specific embodiments.

Figure 2:
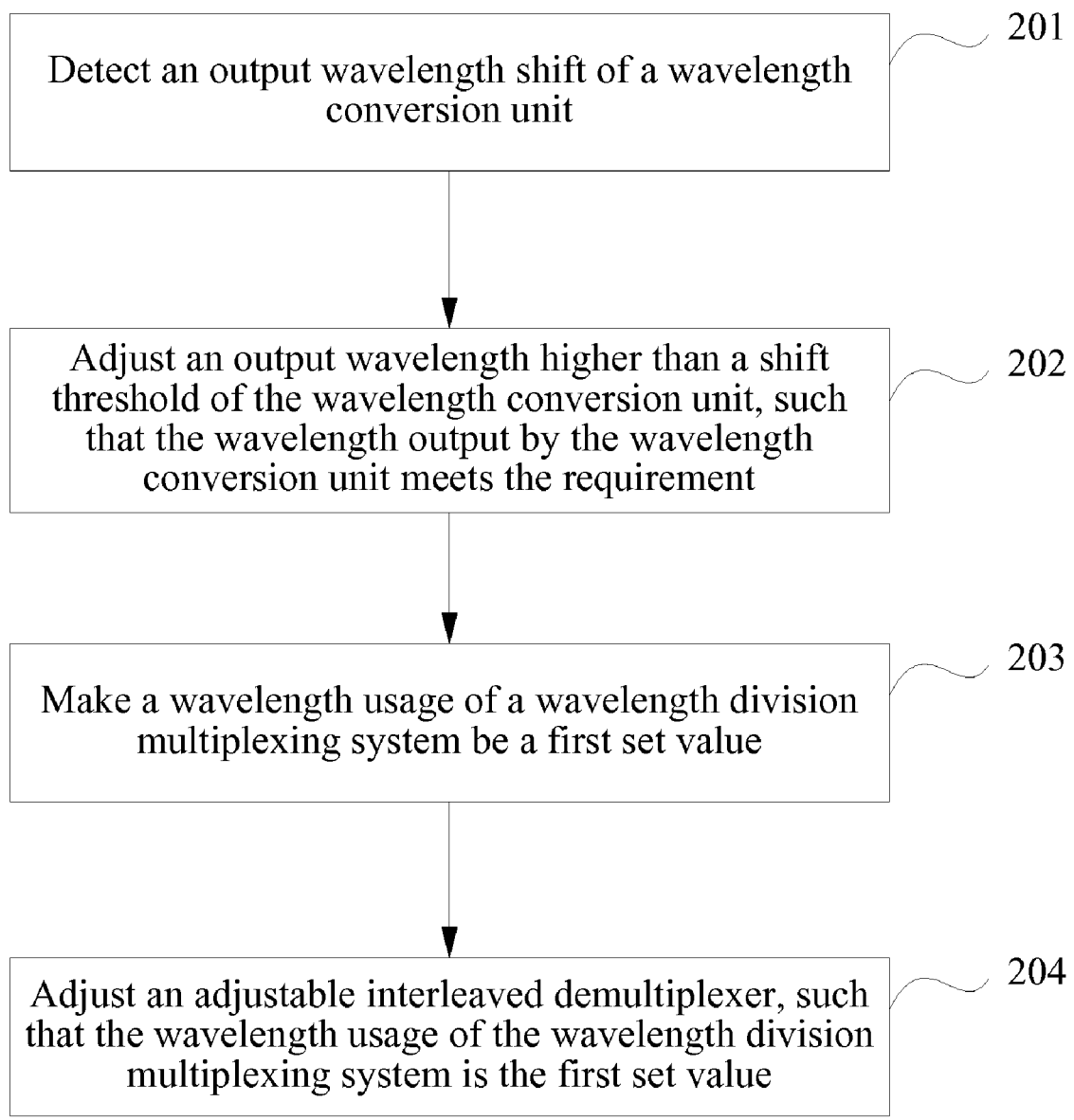
FIG. 2 is a flow chart of an upgrading method of a wavelength division multiplexing system according to Embodiment 2 of the present invention.

FIG. 2 is a flow chart of an upgrading method of a wavelength division multiplexing system according to Embodiment 2 of the present invention. As shown in FIG. 2, the method mainly includes the following steps.

In step 201, the output wavelength shift of the wavelength conversion unit is detected.

The method for detecting the output wavelength shift of the wavelength conversion unit includes, but is not limited to, a standard tool comparative method and a spectrometry method.

It is clear according to the system in Embodiment 1 that, the detection is performed by the wavelength shift detecting unit of the transmitter.

In step 202, the output wavelength of the wavelength conversion unit having the output wavelength higher than the shift threshold is adjusted, so that the wavelength output by the wavelength conversion unit meets the requirement.

The requirements for the wavelength output by the wavelength conversion unit include, but are not limited to, the requirements for stability of the set central wavelength, so that the output wavelength shifts of the wavelength conversion unit for all the activated services are not higher than the shift threshold and fall in the range required by the upgraded WDM system, and various parameter indexes of the upgraded WDM system can be set as required.

In order to make the output wavelength shift of the wavelength conversion unit be no higher than the shift threshold, the applicable method includes, but is not limited to, a method of adjusting a laser temperature and a method of configuring a wavelength conversion unit of high wavelength stability.

In step 203, the wavelength usage of the wavelength division multiplexing system is made to be the first set value.

The wavelength usage of the wavelength division multiplexing system is made to be the first set value by adjusting the adjustable interleaved multiplexer of the transmitter.

The multiplexing parameter includes, but is not limited to, a channel interval, channel bandwidth, and channel isolation.

The parameter of the adjustable interleaved multiplexer is adjusted, that is, the channel interval, channel bandwidth, or channel isolation is adjusted, until the wavelength usage of the WDM is the first set value, that is, the demultiplexing requirement of the upgraded wavelength division multiplexing system is met.

In step 204, the adjustable interleaved demultiplexer is adjusted, so that the wavelength usage of the wavelength division multiplexing system is the first set value.

The adjustable interleaved demultiplexer of the receiver interleaves and demultiplexes the light wave input by the transmitter, and makes the wavelength usage of the wavelength division multiplexing system be the first set value as the transmitter by adjusting the demultiplexing parameter (such as channel interval, channel bandwidth, and channel isolation).

Figure 3:
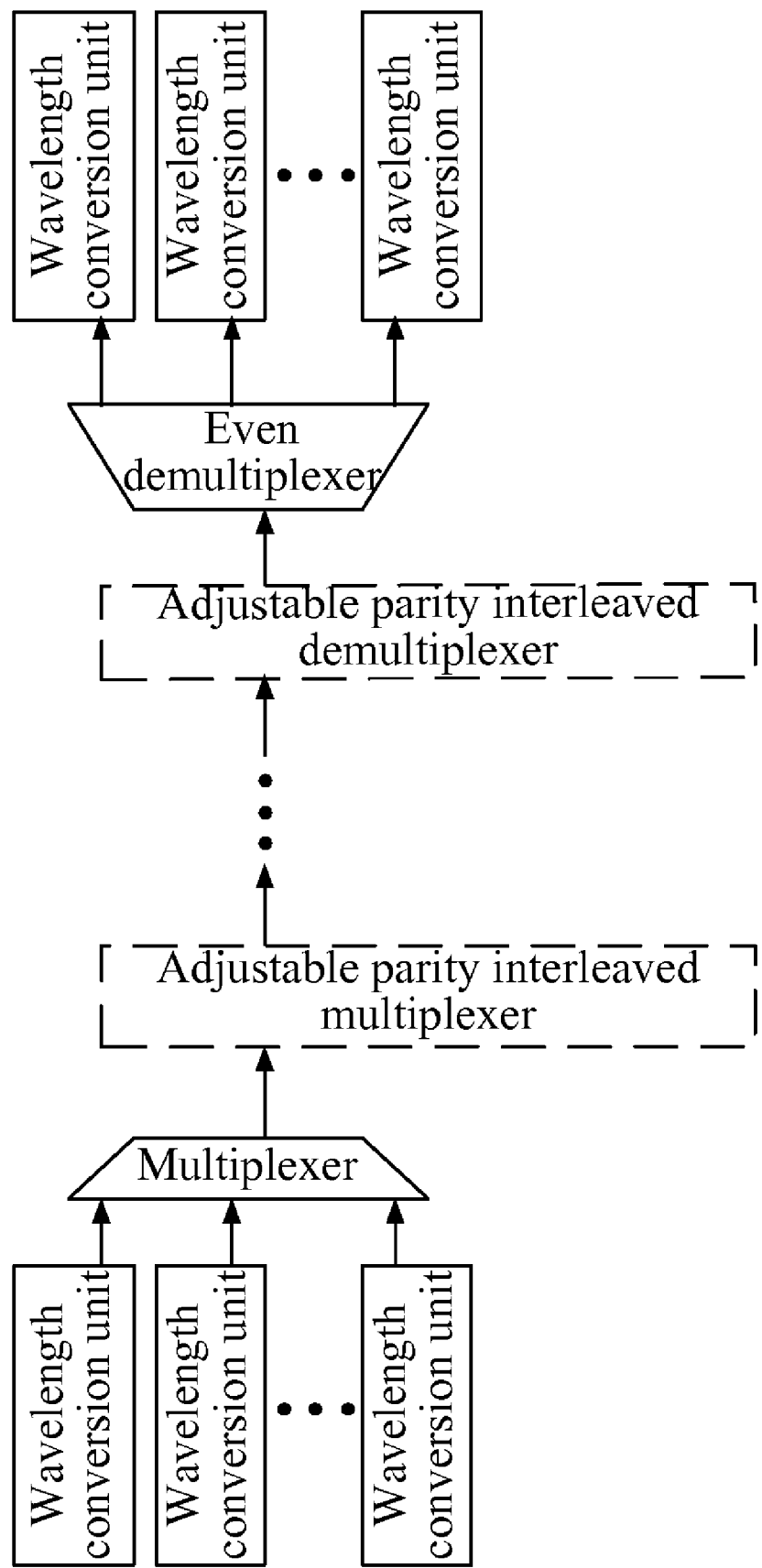
FIG. 3 is a schematic view of a light wave multiplexing and demultiplexing process of a low-density wavelength division multiplexing system according to Embodiment 3 of the present invention.

FIG. 3 is a schematic view of wavelength multiplexing and demultiplexing of a low-density WDM system according to Embodiment 3 of the present invention. It can be seen from FIG. 3 that, if the system includes an adjustable interleaved multiplexer and an adjustable interleaved demultiplexer, before being upgraded, the adjustable interleaved multiplexer and the adjustable interleaved demultiplexer are transparent to the WDM system, that is, do not perform any processing on the light wave, so they are indicated by dashed lines in FIG. 3. For example, if the adjustable interleaved multiplexer and the adjustable interleaved demultiplexer are a bandwidth splitting ratio adjustable parity interleaved multiplexer and a bandwidth splitting ratio adjustable parity interleaved demultiplexer respectively, the bandwidth splitting ratio can be set to 100:0.

After passing through the adjustable parity interleaved multiplexer, the light wave multiplexed by the even low-density multiplexer is further transferred downstream, and after passing through the optical fiber link communication channel including the amplifier, the light wave is transferred to the receiver side. At the receiver side, after passing through the adjustable parity interleaved demultiplexer, the low-density light wave is totally transferred to the even low-density demultiplexer, and the filter formed by combing the even demultiplexer and the parity interleaved demultiplexer is still a low-density demultiplexer.

Actually, the adjustable parity interleaved multiplexer is a comb filter, and can divide the light wave into two groups which are intertwined, and complete the multiplexing and demultiplexing of the high-density light wave together with the low-density multiplexer or demultiplexer.

When the wavelength usage of the low-density WDM system is higher than the second set value, that is, when the wavelength is almost consumed, the system needs to be upgraded to be a high-density WDM system. Embodiment 4 shows the method of determining that the output wavelength shift of each wavelength conversion unit is not higher than the shift threshold through detection, and Embodiment 5 shows the method of configuring the wavelength conversion unit having high wavelength stability directly according to the requirement of the high-density WDM system. The two embodiments are described in detail below.

In Embodiment 4, whether the output wavelength shift of each wavelength conversion unit is no higher than the shift threshold is determined through detection.

Figure 4:
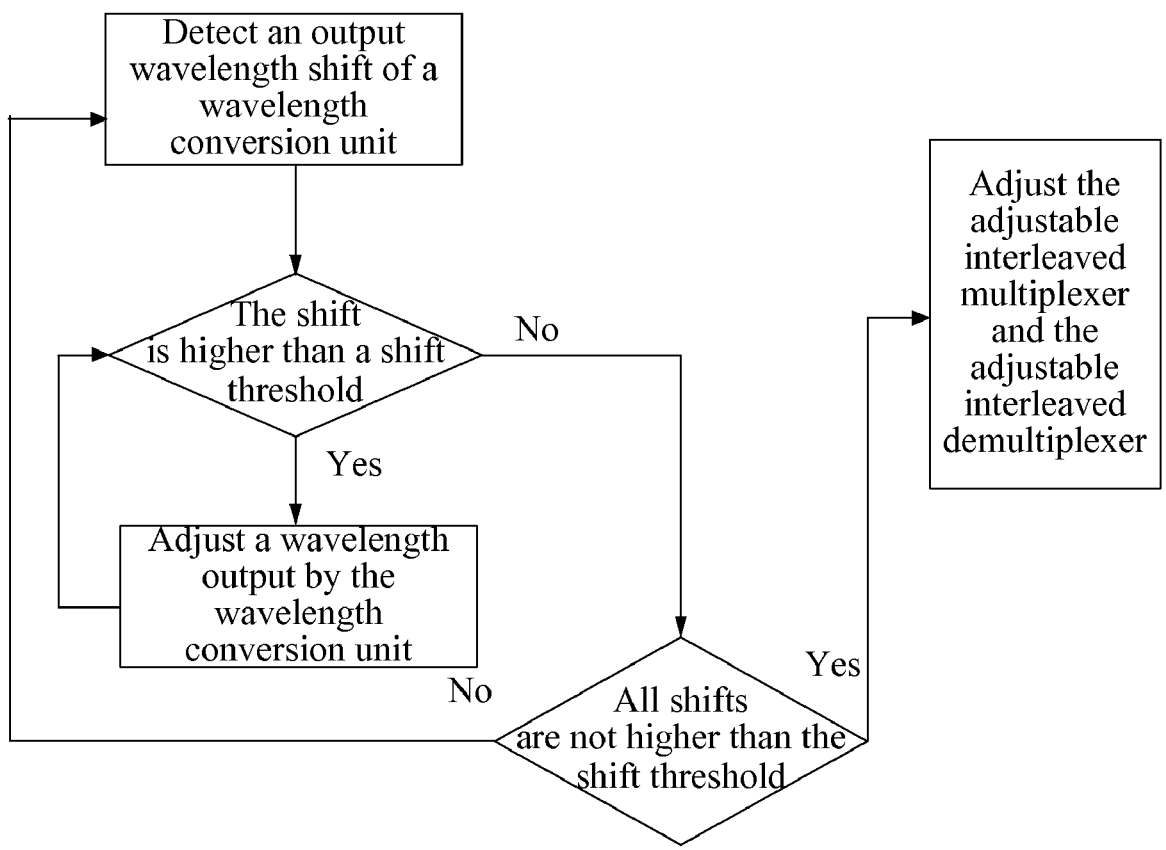
FIG. 4 is a flow chart of a process for detecting whether an output wavelength shift of a wavelength conversion unit is greater than a shift threshold according to Embodiment 4 of the present invention.

First, each output wavelength shift of the wavelength conversion unit is detected, as shown in FIG. 4. If the fixed wavelength multiplexer and the fixed wavelength demultiplexer are a parity interleaved multiplexer and a parity interleaved demultiplexer respectively, the shifts of even wavelengths of the low-density WDM system are detected. The detection method includes, but is not limited to, a wavelength locking method and/or a spectrum detection method. Definitely, the wavelengths of the low-density WDM system may also be the odd wavelengths.

Next, whether the shifts are higher than the shift threshold is judged; if no, no adjustment is performed, and otherwise, the wavelengths corresponding to the shifts higher than the shift threshold are adjusted until each wavelength shift is not higher than the shift threshold.

The process for adjusting the wavelength may be controlling the wavelength conversion module of the wavelength conversion unit, so as to adjust the wavelength output by the wavelength conversion unit.

When all the output wavelength shifts of the wavelength conversion unit are not higher than the shift threshold, the multiplexing parameter of the adjustable interleaved multiplexer is adjusted, and the demultiplexing parameter of the adjustable interleaved demultiplexer is adjusted, until the wavelength usage of the wavelength division multiplexing system is the first set value, that is, the wavelength interval of communication channels is not higher than the set value.

Taking the working process of the bandwidth splitting ratio adjustable parity interleaved demultiplexer for example, the bandwidth splitting ratio is adjusted. When the bandwidth of the adjustable parity interleaved demultiplexer is adjusted, the even wavelengths are continuously output from a port of the adjustable parity interleaved demultiplexer connected to the even wavelength demultiplexer, that is, the output of the even wavelengths from the even wavelength demultiplexer is not influenced, and at the same time, the odd wavelength channel between two adjacent even wavelengths of the original low-density WDM system is separated, and the odd wavelengths are output from the odd wavelength port, such the demultiplexing upgrade from the low-density WDM system to the high-density WDM system is realized. Obviously, the bandwidth splitting ratio adjustable parity interleaved multiplexer at the transmitter side works similarly.

If a coupler instead of the adjustable interleaved multiplexer is configured at the transmitter side, it is unnecessary for the transmitter side to perform the function of the interleaved multiplexer, but the adjustable interleaved demultiplexer of the receiver side is still required to perform such function.

Finally, a wavelength conversion unit and an odd wave multiplexer can be added at an extension interface of the adjustable interleaved multiplexer (similarly, an odd wave demultiplexer and a wavelength conversion unit are required at the receiver side). Thus the upgrade from the low-density WDM system to the high-density WDM system is completed.

If the expanded wavelengths are odd waves, the transmitter side and the receiver side provide an odd wavelength conversion unit, an odd wave multiplexer, and an odd wave demultiplexer for the expanded odd waves.

Figure 5:
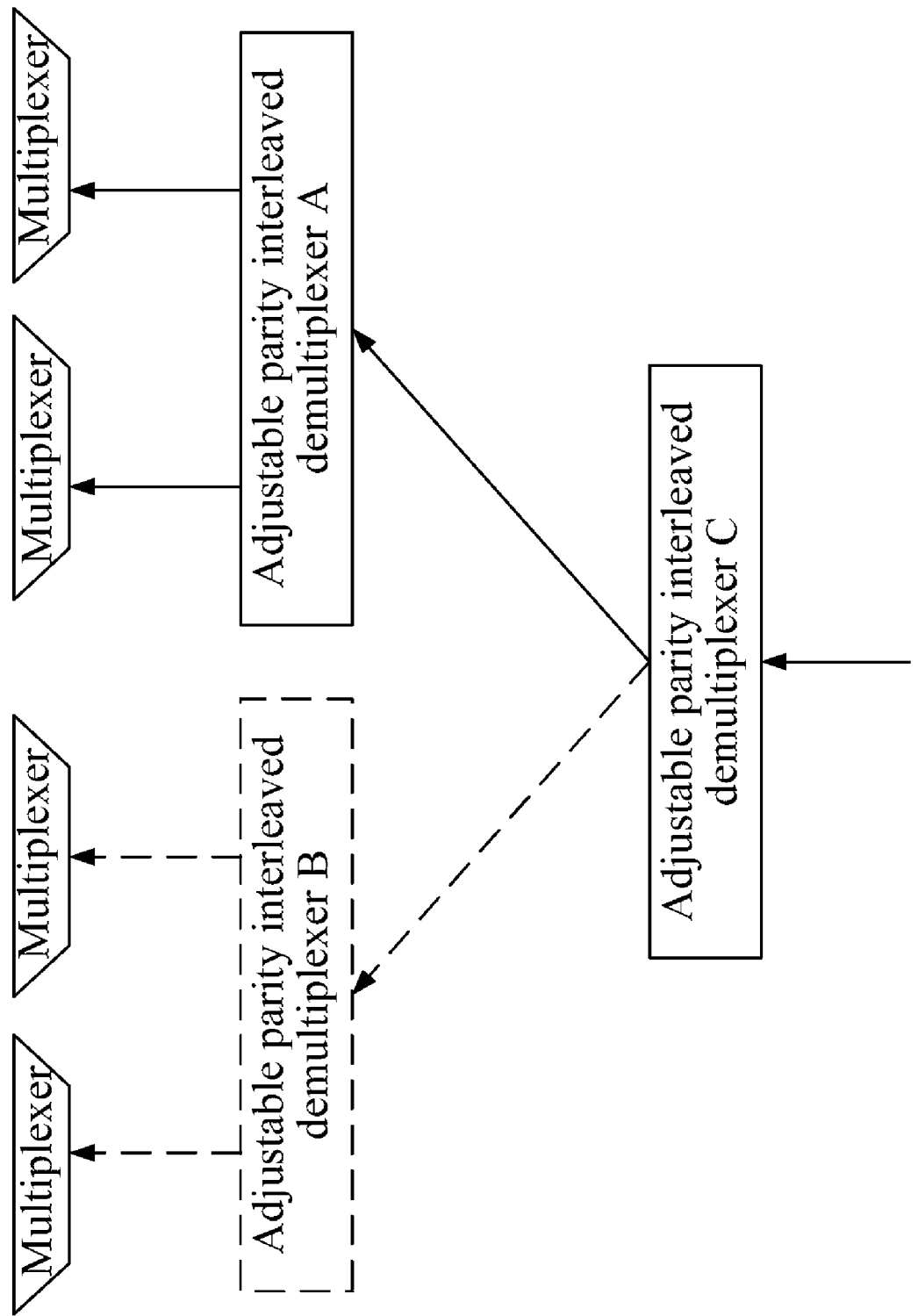
FIG. 5 is a schematic structural view of a receiver that is upgraded for multiple times according to Embodiment 4 of the present invention.

At this time, the low-density WDM system is upgraded to the high-density WDM system, but after a period of time, when the wavelength usage of the wavelength division multiplexing system is higher than the second set value, the high-density WDM system is needs to be upgraded into a higher-density WDM system, and the upgrading system is as shown in FIG. 5, which is a schematic structural view of a receiver when being upgraded for multiple times. As shown in FIG. 5, the solid line part is the structure after the first upgrade, and the part combining the solid lines and dashed lines is the schematic structural view after the second upgrade. The adjustable parity interleaved demultiplexer A is the adjustable interleaved demultiplexer that has been adjusted in the first upgrade, and the adjustable parity interleaved demultiplexer C before the second upgrade is transparent to the WDM system, that is, it will not perform any processing on the light wave. During the second upgrade, the adjustable parity interleaved demultiplexer C interleaves and demultiplexes the light wave input by the transmitter side, and the demultiplexing parameter of the adjustable parity interleaved demultiplexer C is adjusted, so that the wavelength usage of the wavelength division multiplexing system is the first set value. Finally, an adjustable parity interleaved demultiplexer B and a number of wavelength conversion units are added in an extension interface of the adjustable parity interleaved demultiplexer C, and the demultiplexed light wave is output to the adjustable interleaved demultiplexer A and the adjustable parity interleaved demultiplexer B, thus the upgrade from the high-density WDM system to the higher-density WDM system is completed, that is, multiple upgrade is completed. The adjustable parity interleaved demultiplexer C may be a first adjustable parity interleaved demultiplexer.

If an adjustable interleaved multiplexer is configured at the transmitter side, when the wavelength usage of the wavelength division multiplexing system is higher than the second set value, the multiple upgrade is similar to that of the receiver side. Before the multiple upgrade, the first adjustable interleaved multiplexer is transparent to the system; in the multiple upgrade, an adjustable interleaved multiplexer and a number of wavelength conversion units are added in an extension interface of the first adjustable interleaved multiplexer, and the adjustable interleaved multiplexer further multiplexes the light wave multiplexed and output by the adjustable interleaved multiplexer in the previous upgrade, and the multiplexing parameter of the first adjustable interleaved multiplexer is adjusted, so that the wavelength usage of the wavelength division multiplexing system is the first set value.

In short, during the multiple upgrade, the multilevel adjustable interleaved demultiplexers or multilevel adjustable interleaved multiplexers in the WDM system adjust at least one level of the adjustable interleaved demultiplexer, and adjust at least one level of the adjustable interleaved multiplexer.

Figure 6:
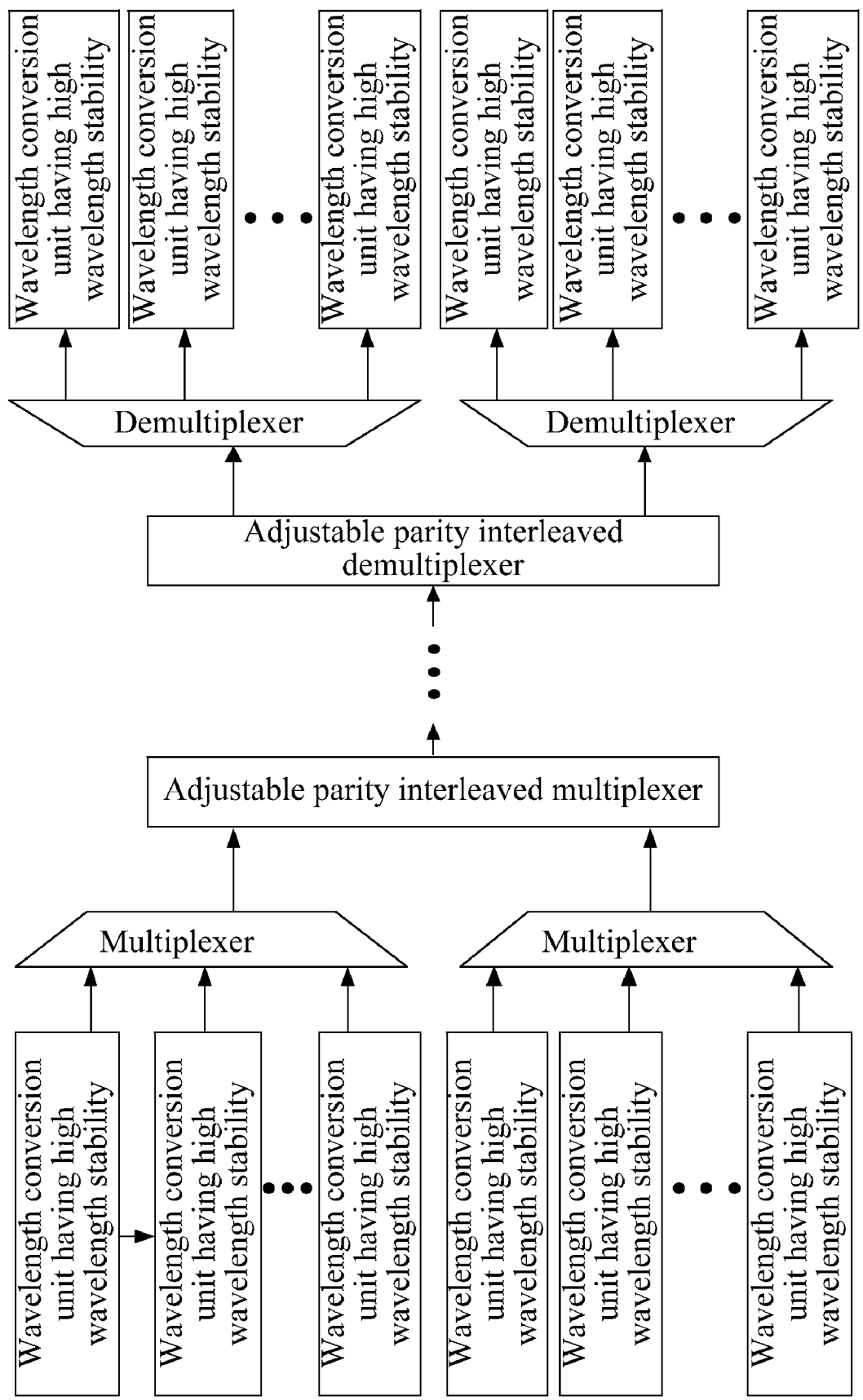
FIG. 6 is a flow chart of an upgrade process of a wavelength division multiplexing system according to Embodiment 5 of the present invention.

FIG. 6 shows another upgrade mode according to Embodiment 5 of the present invention. The difference between Embodiment 5 and Embodiment 4 lies in that the adjustable interleaved multiplexer is not necessarily configured at the transmitter side, but a wavelength conversion unit having high wavelength stability is configured, so that the wavelength shifts output by the configured wavelength conversion unit are not higher than the shift threshold. However, at the receiver side, an adjustable interleaved demultiplexer must be configured. In Embodiment 5, the upgrade process, even the multiple upgrade process at the receiver side, is as the same as that of Embodiment 4.

The upgrade processes of the transmitter side and the receiver side are described below respectively.

Figure 7:
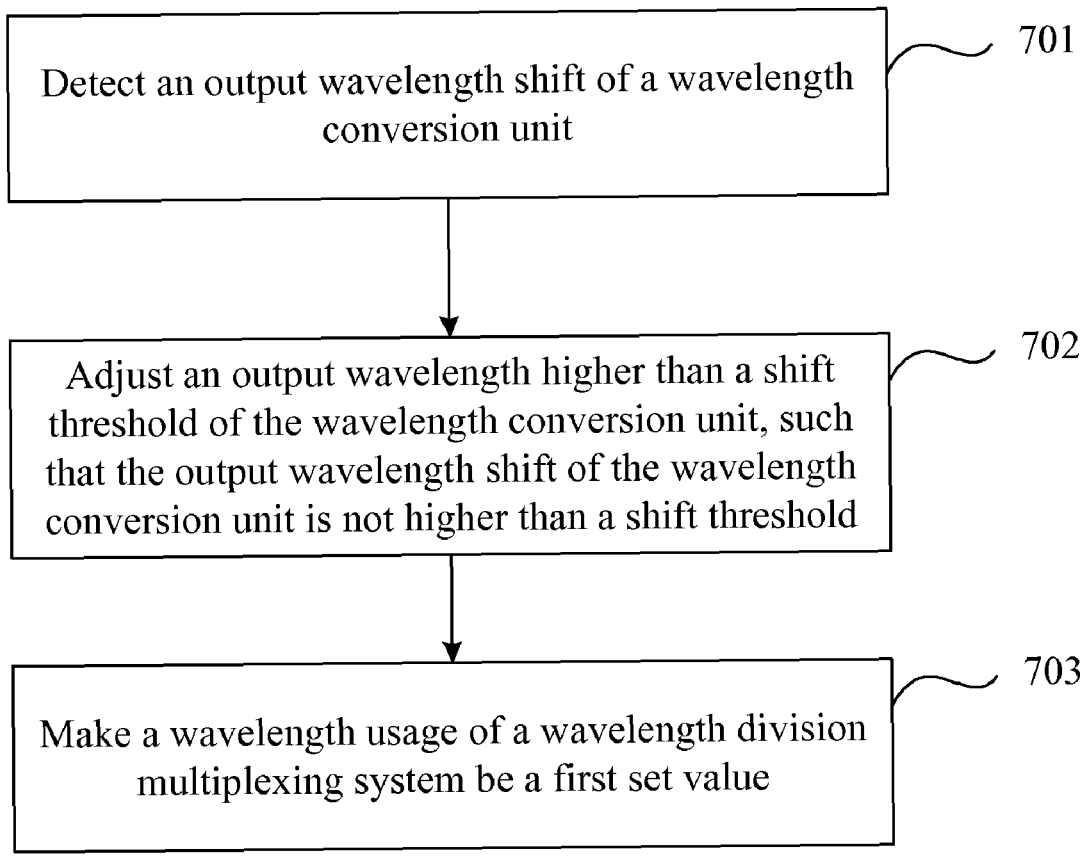
FIG. 7 is a flow chart of a multiplexing upgrading method of a wavelength division multiplexing system according to Embodiment 6 of the present invention.

FIG. 7 is a flow chart of a multiplexing upgrading method of a WDM system according to Embodiment 6 of the present invention, and the method mainly includes the following steps.

In step 701, the output wavelength shift of the wavelength conversion unit is detected.

The determination process of step 701 is the same as that of step 201, and includes, but is not limited to, detecting the output wavelength shift of each wavelength conversion unit.

In step 702, according to the detection result, the output wavelength greater than the shift threshold of the wavelength conversion unit is adjusted, so that the output wavelength shift of the wavelength conversion unit is not higher than the shift threshold.

This step is also similar to step 202.

Alternatively, a wavelength conversion unit having high wavelength stability is directly configured, so that the wavelength shift of the configured wavelength conversion unit is not higher than the shift threshold.

In step 703, the wavelength usage of the wavelength division multiplexing system is made to be the first set value.

The WDM system includes an adjustable interleaved multiplexer, and the wavelength usage of the wavelength division multiplexing system can be made to be the first set value by adjusting the multiplexing parameter of the adjustable interleaved multiplexer.

The working process of the multiplexing and upgrading of the WDM system according to Embodiment 6 of the present invention is the same as that of Embodiments 3, 4, and 5 in which the system has configured an adjustable interleaved multiplexer, and includes adjusting the channel interval, channel bandwidth, or channel isolation of the adjustable interleaved multiplexer until the multiplexing requirement of the upgraded wavelength division multiplexing system is met.

The WDM system includes one or more levels of adjustable interleaved multiplexers for adjusting at least one level of adjustable interleaved multiplexer. The multiple upgrade process is the same as that of the transmitter side according to Embodiment 4.

According to the description of the multiplexing upgrading method of Embodiment 6, in an embodiment, the present invention also provides a low-density WDM upgrading system, and the multiplexing upgrading system is similar to that of the transmitter side of the upgrading system according to Embodiment 1.

The demultiplexing upgrading method of the WDM system according to Embodiment 7 of the present invention mainly includes: adjusting the demultiplexing parameter of the adjustable interleaved demultiplexer until the demultiplexing requirement of the upgraded wavelength division multiplexing system is met, that is, the wavelength usage of the wavelength division multiplexing system is the first set value.

In this embodiment, the working mode of the demultiplexing upgrading method is similar to that of the receiver side in Embodiments 3, 4, and 5, and the WDM demultiplexing upgrading system corresponding to the method is also similar to that of the receiver side in Embodiment 1.

Figure 8:
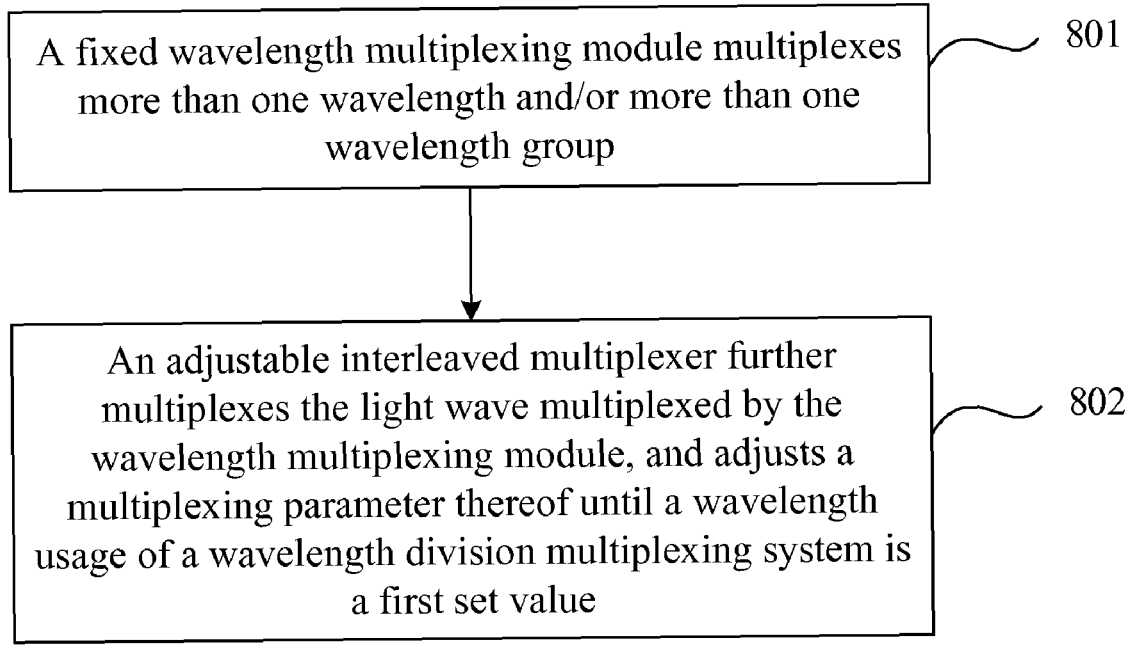
FIG. 8 is a flow chart of a wavelength multiplexing method according to Embodiment 7 of the present invention.

FIG. 8 is a flow chart of a wavelength multiplexing method according to Embodiment 7 of the present invention. The method is applicable to the system including one or more fixed wavelength multiplexing modules and one or more adjustable interleaved multiplexers, and mainly includes the following steps.

In step 801, the fixed wavelength multiplexing module multiplexes more than one wavelength and/or more than one wavelength group.

The fixed wavelength multiplexing module can be an even multiplexer and odd multiplexer.

Figure 9:
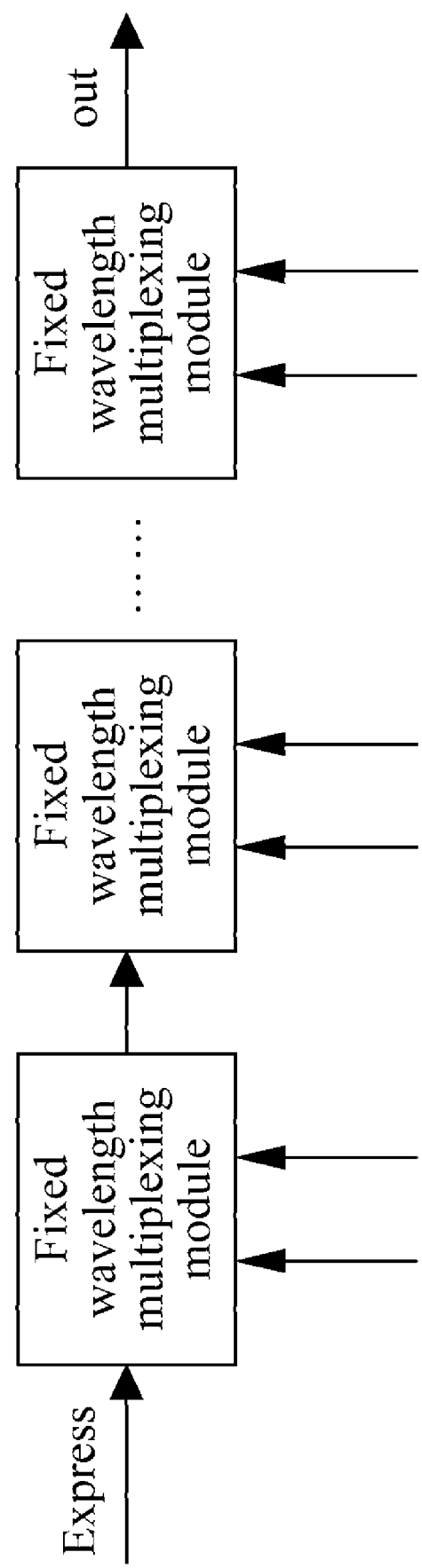
FIG. 9 is a schematic view of a series structure of wavelength multiplexing units according to Embodiment 7 of the present invention.

The fixed wavelength multiplexing module completes the add multiplexing of one or more wavelengths and conventional wavelengths, and multiple such wavelength multiplexing units are connected in series to multiplex multiple wavelengths, as shown in FIG. 9.

In step 802, the adjustable interleaved multiplexer further multiplexes the light wave multiplexed by the wavelength multiplexing module, and adjusts the multiplexing parameter thereof until the demultiplexing requirement of the upgraded wavelength division multiplexing system is met, that is, the wavelength usage of the wavelength division multiplexing system is the first set value.

The channel interval, channel bandwidth, or channel isolation of the adjustable interleaved multiplexer is adjusted, until the wavelength usage of the wavelength division multiplexing system is the first set value.

The adjustable interleaved multiplexer includes an extension port, and after adjusting the multiplexing parameter thereof, the adjustable interleaved multiplexer is connected to one or more fixed wavelength multiplexing modules for multiplexing through the extension port.

In order to achieve the purpose of multiple upgrade, the system includes one or more levels of adjustable interleaved multiplexers for adjusting at least one level of adjustable interleaved multiplexer. The multiple upgrade process is similar to that of the transmitter side according to Embodiment 4.

Figure 10:
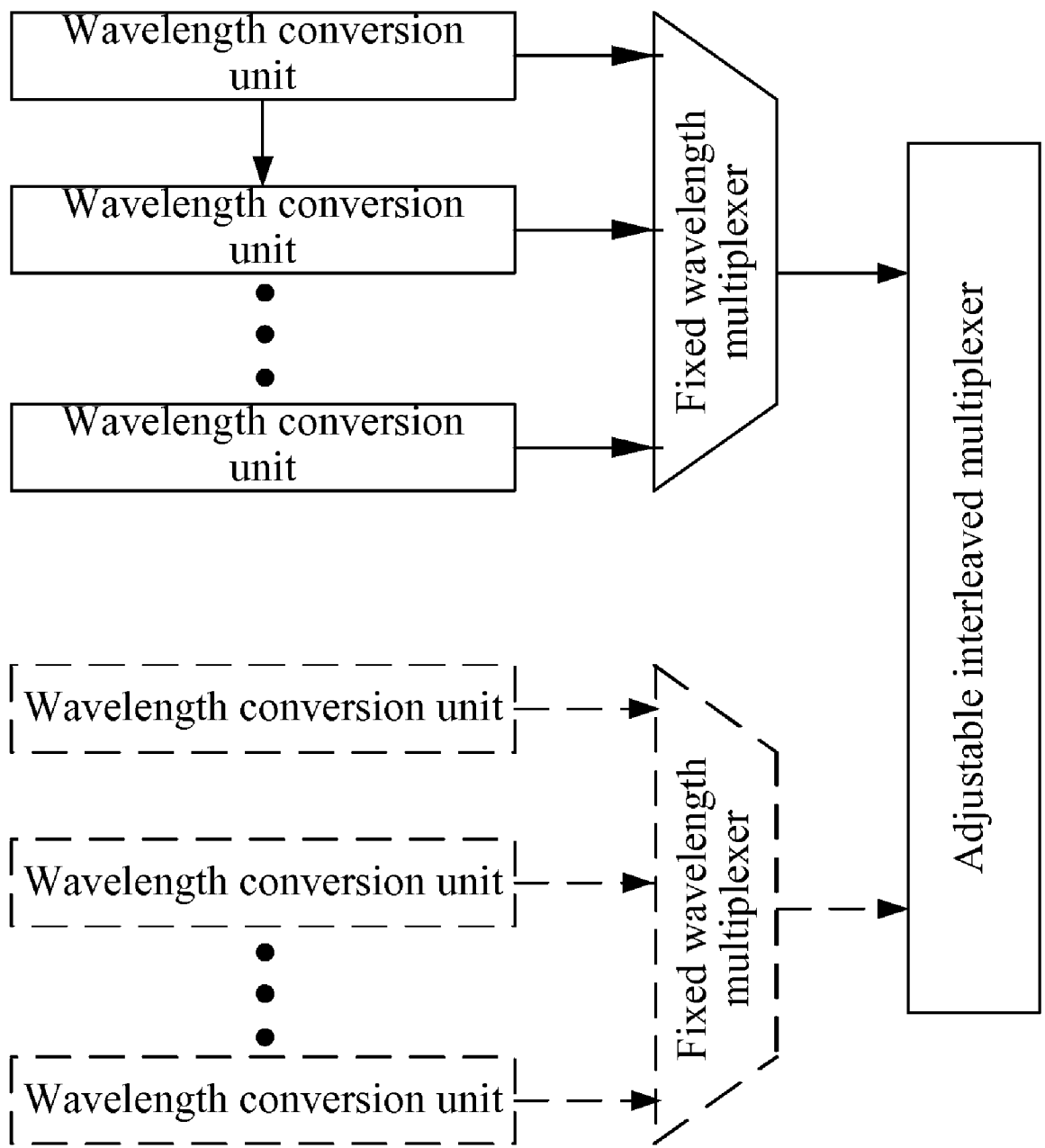
FIG. 10 is a schematic structural view of a wavelength multiplexing apparatus according to Embodiment 7 of the present invention.

In Embodiment 7, the present invention provides an upgradeable wavelength multiplexing apparatus. As shown in FIG. 10, the apparatus includes an adjustable interleaved multiplexer and one or more fixed wavelength multiplexing modules. The fixed wavelength multiplexing module is configured to multiplex more than one wavelength, and/or more than one wavelength group. The adjustable interleaved multiplexer is connected to the fixed wavelength multiplexing module, and is configured to further multiplex the light wave multiplexed by the fixed wavelength multiplexing module and adjust the multiplexing parameter thereof to make the wavelength usage of the wavelength division multiplexing system be the first set value.

After one upgrade process is completed, more than one fixed wavelength multiplexing module is further connected to a port of the adjusted adjustable interleaved multiplexer, so as to meet the multiplexing requirement after the upgrade, as shown in the dashed lines in FIG. 10.

The fixed wavelength multiplexing modules can be combined through parallel and/or serial connection, thus further forming a fixed wavelength multiplexing module.

The adjustable interleaved multiplexer can be adjusted according to the channel interval, channel bandwidth, or channel isolation.

The apparatus can also include one or more levels of adjustable interleaved multiplexers, in which the multiple upgrade is similar to that of the transmitter in Embodiment 1.

Figure 11:
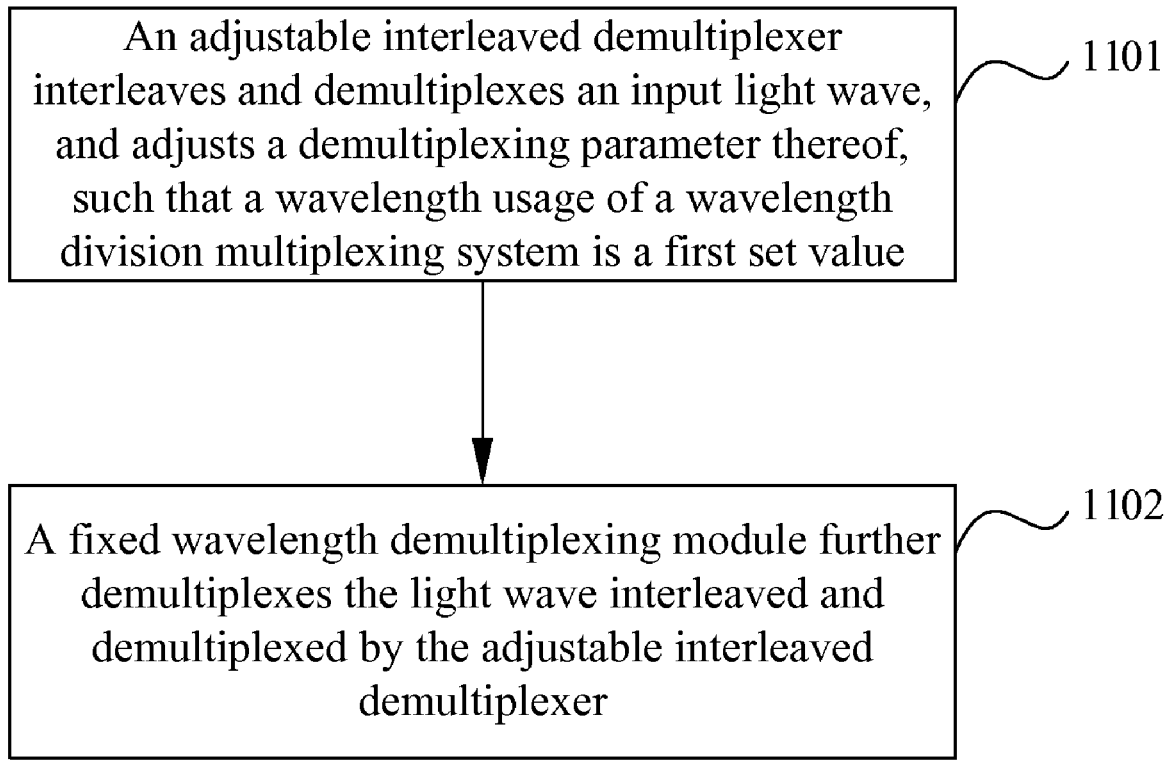
FIG. 11 is a flow chart of a wavelength demultiplexing method according to Embodiment 8 of the present invention.

FIG. 11 is a flow chart of a wavelength demultiplexing method according to Embodiment 8 of the present invention. The method is applicable to the system including one or more fixed wavelength multiplexing modules and one or more adjustable interleaved multiplexers, and mainly includes the following steps.

In step 1101, the adjustable interleaved demultiplexer interleaves and demultiplexes the input light wave, and adjusts the demultiplexing parameter thereof, so that the wavelength usage of the wavelength division multiplexing system is the first set value.

The channel interval, channel bandwidth, or channel isolation of the adjustable interleaved demultiplexer is adjusted, until the demultiplexing requirement of the upgraded wavelength division multiplexing system is met, that is, the wavelength usage of the wavelength division multiplexing system is the first set value.

In step 1102, the fixed wavelength demultiplexing module further demultiplexes the wavelength interleaved and demultiplexed by the adjustable interleaved demultiplexer.

The adjustable interleaved demultiplexer includes an extension port, and after adjusting the demultiplexing parameter, the adjustable interleaved demultiplexer is connected to one or more fixed wavelength demultiplexing modules to perform demultiplexing through the extension port.

The multiple upgrade process is similar to that of the receiver side in Embodiment 4.

Figure 12:
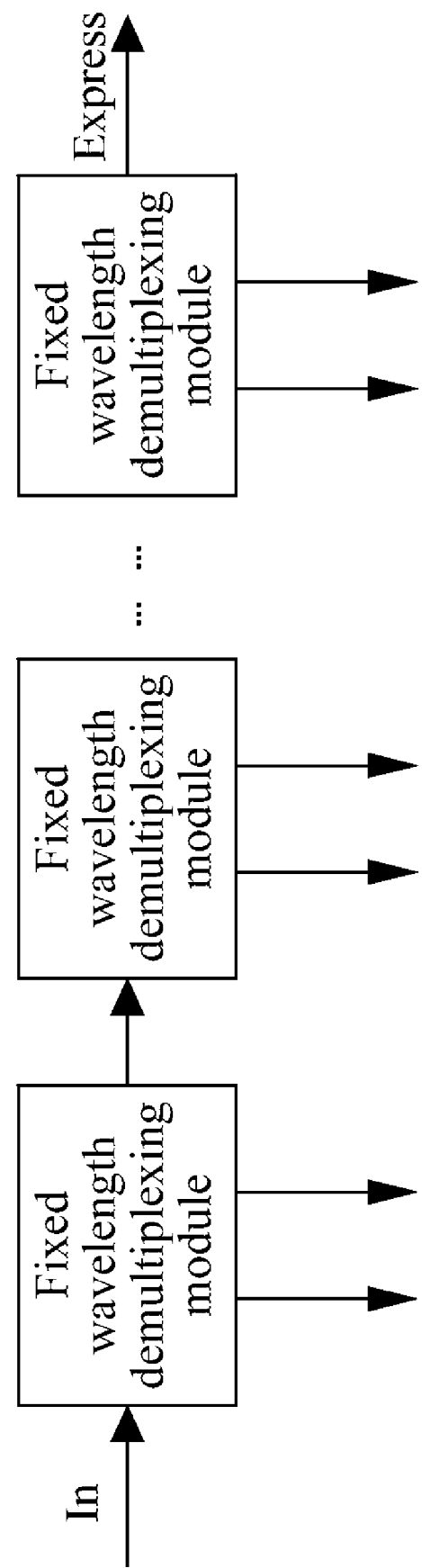
FIG. 12 is a schematic view of a series structure of fixed wavelength demultiplexing modules according to Embodiment 8 of the present invention.

Each fixed wavelength demultiplexing module drops one or more wavelengths, but the wavelengths dropped by different wavelength demultiplexing modules are not the same. To drop multiple wavelengths, it is often required to connect multiple fixed wavelength demultiplexing modules in series, so as to complete wavelength demultiplexing, as shown in FIG. 12.

Figure 13:
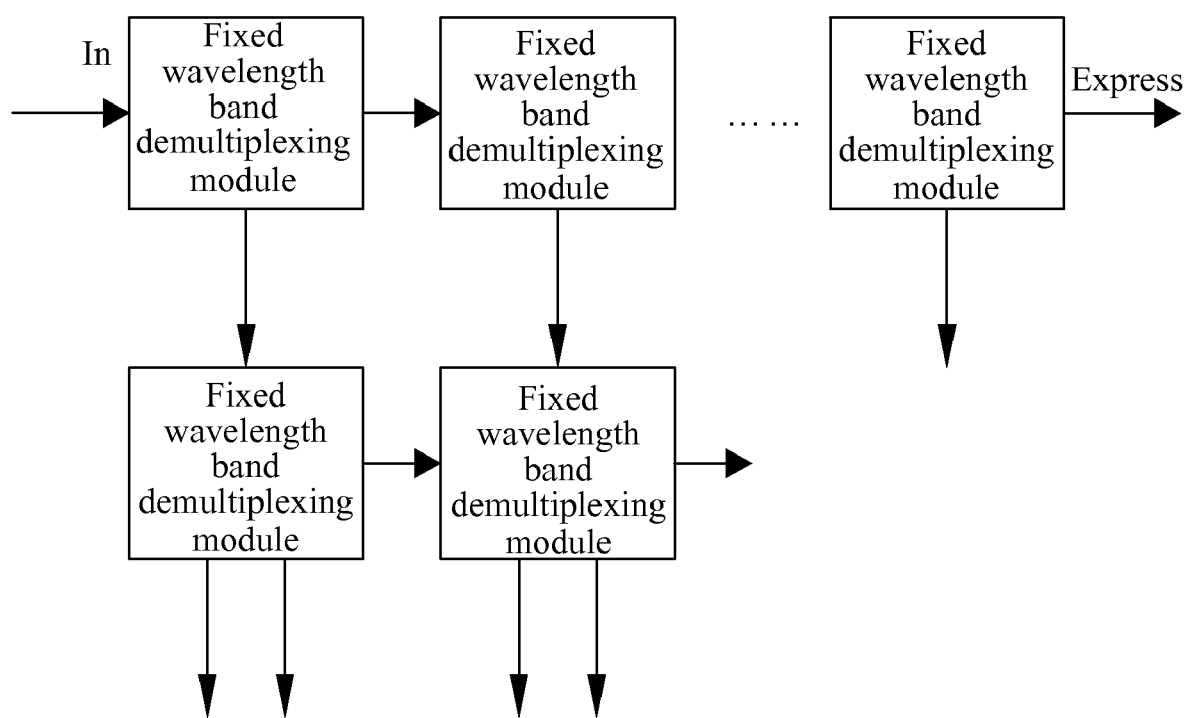
FIG. 13 is a schematic view of a series structure of fixed wavelength band demultiplexing modules according to Embodiment 8 of the present invention.
Figure 14:
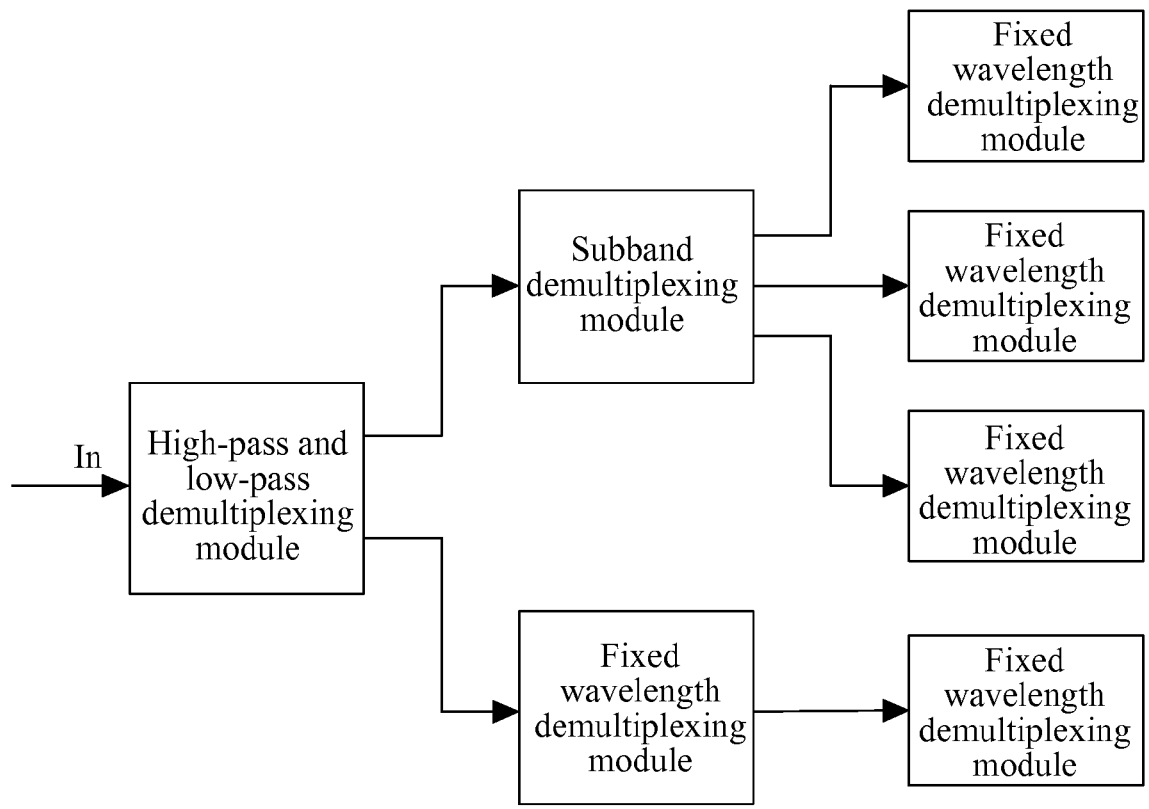
FIG. 14 is a schematic structural view of stage-by-stage demultiplexing of multiple wavelengths in a high-pass and low-pass subband mode according to Embodiment 8 of the present invention.

In order to avoid the problem of excessive large insertion loss caused by the subband mode, subband filters are used to reduce the insertion loss. That is, through the series connection of the stripping filters, multiple wavelength bands are dropped, and then, the wavelength of each band can be demultiplexed by using multiple fixed wavelength band demultiplexing modules, as shown in FIG. 13. Additionally, stage-by-stage demultiplexing of multiple wavelengths can be completed through a high-pass and low-pass subband mode, as shown in FIG. 14, which can be considered as multiple combinations of parallel connection and series connection in demultiplexing.

Figure 15:
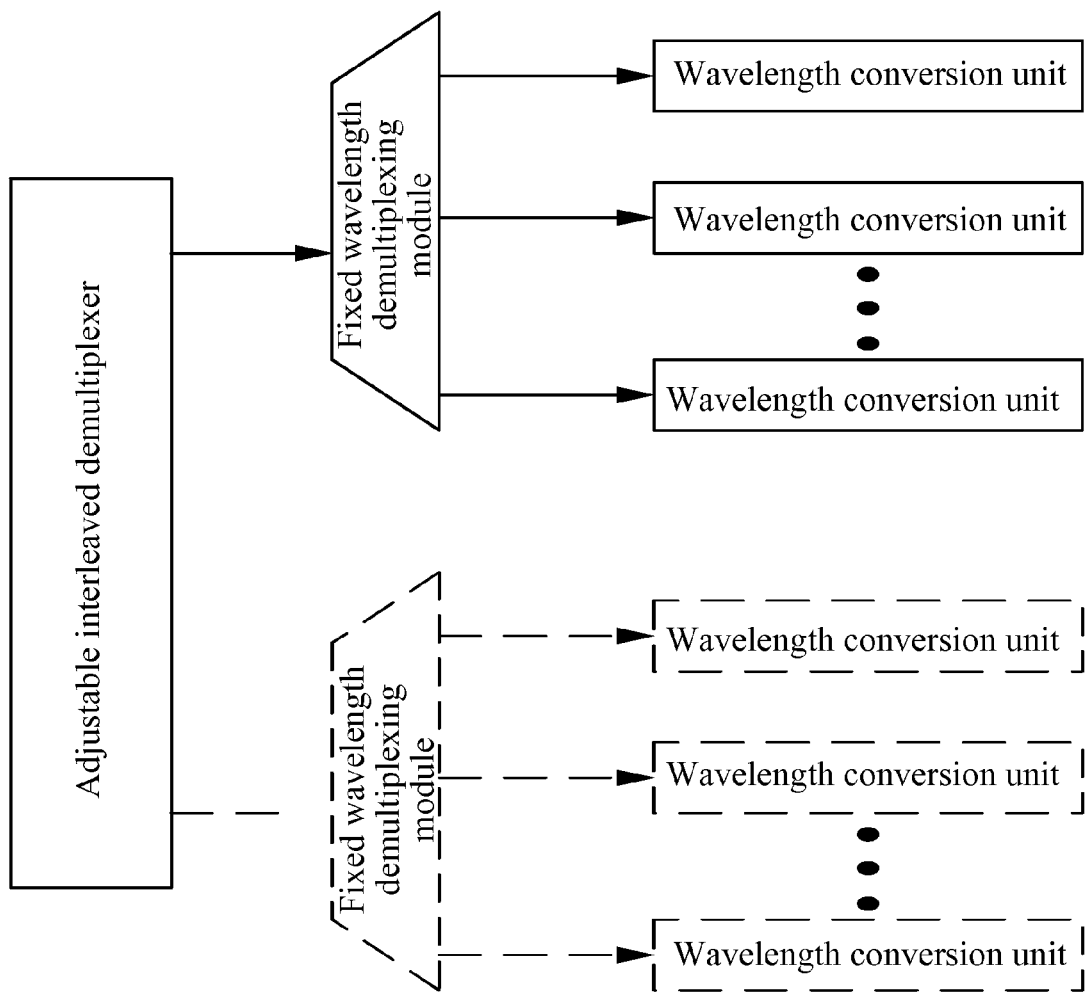
FIG. 15 is a schematic structural view of a wavelength demultiplexing apparatus according to Embodiment 8 of the present invention.

FIG. 15 is a schematic structural view of a wavelength demultiplexing apparatus according to Embodiment 8 of the present invention. The apparatus includes one or more adjustable interleaved demultiplexers and one or more fixed wavelength demultiplexing modules. The adjustable interleaved demultiplexer is configured to interleave and demultiplex the input light wave and adjust the demultiplexing parameter thereof, so that the wavelength usage of the wavelength division multiplexing system is the first set value. The fixed wavelength demultiplexing module is connected to the adjustable interleaved demultiplexer, and is configured to further demultiplex the light wave interleaved and demultiplexed by the adjustable interleaved demultiplexer.

The adjustable interleaved demultiplexer is configured to adjust the channel interval, channel bandwidth, or channel isolation so that the wavelength usage of the wavelength division multiplexing system is the first set value.

The wavelength demultiplexing modules are combined through parallel and/or serial connection.

The system includes one or more levels of adjustable interleaved demultiplexers, for adjusting at least one level of adjustable interleaved demultiplexer.

After one upgrade process is completed, more than one fixed wavelength multiplexing module is further connected to a port of the adjusted adjustable interleaved multiplexer, so as to meet the multiplexing requirement after the upgrade, as shown in the dashed lines in FIG. 15. The multiple upgrade process is similar to that of the receiver in Embodiment 1.

With the method and system according to the embodiments of the present invention, the problem that the services are interrupted when a low-density WDM system is upgraded to a high-density WDM system is solved. Furthermore, the cost of the initial system is reduced, while the scalability for multiple upgrade is maintained.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. An upgradeable low-density wavelength division multiplexing (WDM) system, comprising:
   a transmitter side, comprising an adjustable interleaved multiplexer or a coupler, one or more wavelength conversion units, one or more fixed wavelength multiplexing units, wherein an optical signal output by the wavelength conversion unit is multiplexed through the fixed wavelength multiplexing unit, the optical signal output by the fixed wavelength multiplexing unit is further multiplexed by the adjustable interleaved multiplexer or the coupler;

a receiver side, comprising an adjustable interleaved demultiplexer, one or more fixed wavelength demultiplexing units, one or more wavelength conversion units, wherein the adjustable interleaved demultiplexer interleaves and demultiplexes the received optical signal, transfers the interleaved and demultiplexed optical signal to the fixed wavelength demultiplexing unit to complete the demultiplexing of a wavelength signal, and transfers the demultiplexed wavelength signal to the wavelength conversion unit; and a control unit, configured to transmit an adjust command to the adjustable interleaved demultiplexer when a wavelength usage of the low-density WDM system reaches a threshold;

wherein the adjustable interleaved demultiplexer is configured to perform adjustment according to the received adjust command until requirements for a demultiplexing parameter of a high-density WDM system are met.

2. The upgradeable low-density WDM system according to claim 1, further comprising:

a wavelength shift detecting unit, configured to detect an output wavelength shift of the wavelength conversion unit;

wherein the control unit is configured to transmit an adjust command to a wavelength conversion unit having the output wavelength shift higher than a threshold according to a detection result of the wavelength shift detecting unit; and the wavelength conversion unit adjusts the output wavelength according to the adjust command, so that the output wavelength shift of the wavelength conversion unit is lower than the threshold.

3. The upgradeable low-density WDM system according to claim 1, wherein the wavelength conversion unit is a wavelength conversion unit having high wavelength stability.

4. The upgradeable low-density WDM system according to claim 1, wherein the adjustable interleaved multiplexer of the low-density WDM system is adjusted until requirements for a multiplexing parameter of the high-density WDM system are met.

5. The upgradeable low-density WDM system according to claim 4, wherein the demultiplexing parameter or the multiplexing parameter comprises a channel interval, a channel bandwidth, or channel isolation.

* * * * *